July 24, 1923.
R. F. HAUGHEY
PIPE COUPLING
Filed Sept. 25, 1922
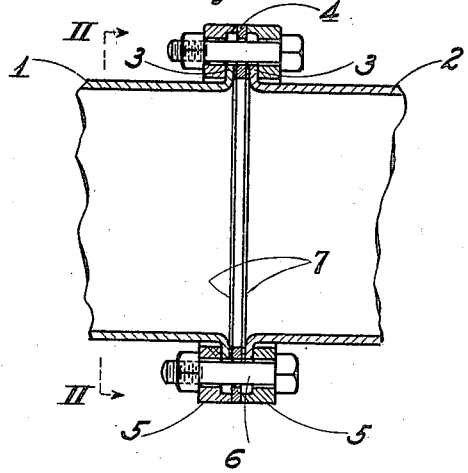
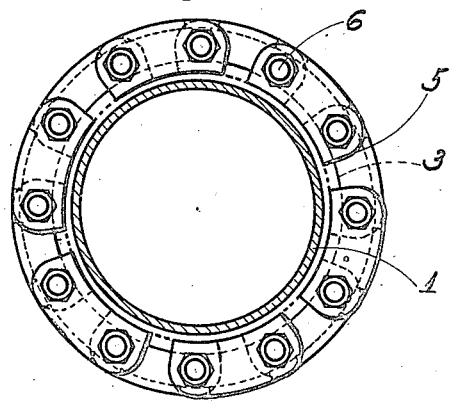
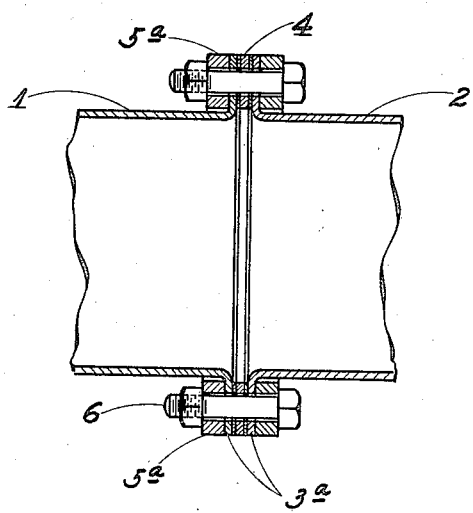
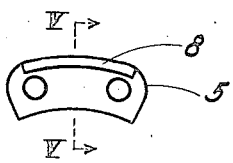
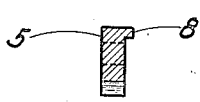
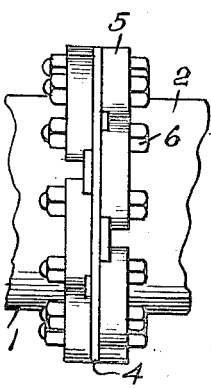
WITNESSES
INVENTOR
ATTORNEYS Patented July 24, 1923.

1,462,698

UNITED STATES PATENT OFFICE.

RODGER F. HAUGHEY, OF McKEESPORT, PENNSYLVANIA.

PIPE COUPLING.

Application filed September 25, 1922. Serial No. 590,239.

*To all whom it may concern:*

Be it known that I, RODGER F. HAUGHEY, a citizen of the United States, and a resident of McKeesport, in the county of Allegheny and State of Pennsylvania, have invented a new and useful Improvement in Pipe Couplings, of which the following is a specification.

This invention relates to flange couplings for pipes, and while applicable to pipes cast or otherwise formed of metal or other materials, is particularly useful in connection with welded and seamless steel and iron pipes.

The object is to provide a coupling which may be economically manufactured and used for pipes having different diameters, which may be easily assembled, which affords a strong and durable joint, and which prevents the joint from failing in case a part of the coupling should break.

The invention is illustrated in the accompanying drawings of which Fig. 1 is a vertical central sectional view through the ends of meeting flanged pipes showing the coupling applied; Fig. 2 a transverse sectional view taken on the line II—II, Fig. 1; Fig. 3 a view similar to Fig. 1 showing a modification of construction; Fig. 4 a face view of a segment forming a part of the coupling; Fig. 5 a sectional view taken on the line V—V, Fig. 4; and Fig. 6 a side elevation of the coupling shown in Figs. 1 and 2.

Having reference first to the embodiment of the invention illustrated particularly in Fig. 1, a pair of pipes 1 and 2 are provided at their meeting ends with flanges 3 which may both be of small width and hence easily formed on the pipes. Between the adjacent faces of the flanges there is arranged a metal retaining ring 4 which projects beyond the outer edges of the flanges and is provided at proper intervals with holes to receive clamping bolts. Engaging the outer faces of the flanges there is a clamp formed of small segments 5 having holes through their ends. Each segment overlaps the ends of a pair of adjacent segments on the opposite side of the pipe flanges as is clearly seen in Fig. 2. In other words the segments forming the clamp are arranged in staggered relationship with each other on opposite sides of the pipe flanges. Bolts 6 extend through the ends of the segments and the holes in the retaining ring 4, and when nuts are tightened on the bolts, the pipe flanges 3 are brought into firm engagement with the faces of the inner portions of the retaining ring.

To render the joint fluid-tight, packing rings 7 may be arranged one on each side of the retaining ring between it and the adjacent faces of the pipe flanges. As particularly seen in Figs. 4 and 5, each segment 5 is preferably provided with a lug 8 projecting from its face and adapted to bear on the outer portion of the retaining ring, the lugs substantially equalling in depth the thickness of the pipe flanges. These lugs are effective to hold the clamp segments 5 substantially parallel with the pipe flanges so that when the nuts are tightened on the clamping bolts 6 the inner portions of the segments bear uniformly over an extended area of the pipe flanges.

In the embodiment of the invention illustrated in Fig. 3, the flanges 3ª of the pipes are of substantially the same outer diameter as is the retaining ring 4ª, and the clamping segments 5ª are flat faced, rather than being provided with lugs. Otherwise the coupling is the same as that illustrated in Fig. 1.

To form a joint with the improved coupling, it is not necessary to apply the clamping segments to the pipes before they are flanged. Flanged pipes may be arranged end to end with the retaining ring 4, and, if desired, packing rings or gaskets 7 between them. The clamping segments are then built up by passing bolts 6 through the ends of the segments 5 which are arranged in overlapping or staggered relation until the complete clamp is formed.

An important advantage in the use of a retaining ring in combination with the clamp formed of small segments is that, in case a segment should break, the retaining ring will hold the remainder of the segments in position so that the joint as a whole will not fail. To repair the clamp it is only necessary to remove the broken segment and replace it with a new one. A further advantage in forming the clamp of a large number of small segments in the manner shown is that the segments may be used for forming clamps for pipes of different diameters. In forming a coupling for pipes of considerably smaller diameter than that indicated in the drawings, a clamping segment may be omitted from each side of the pipe flanges, and in forming a joint for larger pipes a clamping segment may be added to each side.

I claim:

1. In a flange pipe coupling, the combination with a pair of pipes having flanges at their meeting ends, of a clamp formed of small segments alternately engaging the opposite outer faces of the flanges and arranged in staggered relationship with each other, the ends of each segment overlapping the adjacent ends of a pair of adjacent segments on the opposite side of the flanges, a rigid retaining ring arranged between the flanges, and clamping bolts extending through the retaining ring and the ends of the clamping segments.

2. In a flange pipe coupling, the combination with a pair of pipes having flanges at their meeting ends, of a clamp formed of small segments alternately engaging the opposite outer faces of the flanges and arranged in staggered relationship with each other, the ends of each segment overlapping the adjacent ends of a pair of adjacent segments on the opposite side of the flanges, a rigid retaining ring arranged between and projecting beyond the pipe flanges, and clamping bolts extending through the retaining ring and the ends of the clamping segments beyond the flanges.

3. In a flange pipe coupling, the combination with a pair of pipes having flanges at their meeting ends, of a clamp formed of small segments alternately engaging the opposite outer faces of the flanges and arranged in staggered relationship with each other, the ends of each segment overlapping the adjacent ends of a pair of adjacent segments on the opposite side of the flanges, a rigid retaining ring arranged between and projecting beyond the pipe flanges, and clamping bolts extending through the retaining ring and the ends of the clamping segments beyond the flanges, the outer faces of the clamping segments being provided with lugs bearing against the outer portion of the retaining ring thereby holding the segments firmly against the faces of the pipe flanges.

In testimony whereof, I sign my name.

RODGER F. HAUGHEY.

Witness:
   EDWIN O. JOHNS.